May 10, 1949.  B. H. WAIT  2,469,585
BITUMINOUS MIX
Filed March 29, 1944
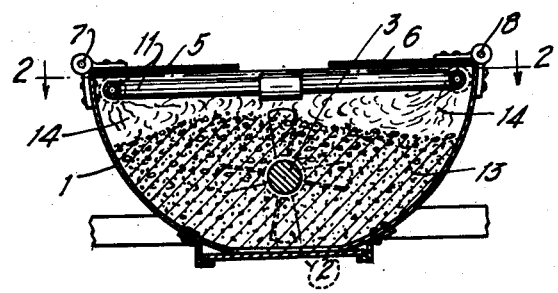
FIG.1
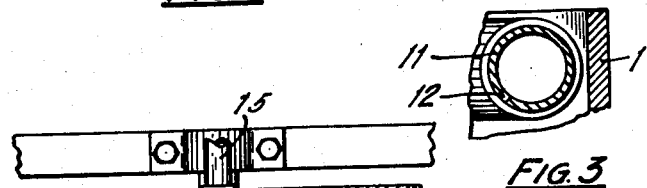
FIG.3
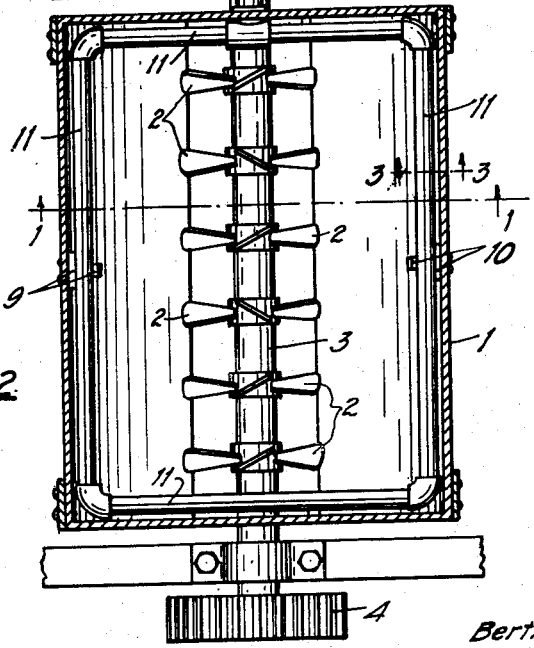
FIG.2
INVENTOR
Bertrand H. Wait
by
ATTORNEY Patented May 10, 1949

2,469,585

UNITED STATES PATENT OFFICE 2,469,585

BITUMINOUS MIX

Bertrand H. Wait, New Rochelle, N. Y.

Application March 29, 1944, Serial No. 528,631

3 Claims. (Cl. 259—148)

My invention relates to pavements and the like, and particularly to an improved method of preparing bituminous mixes for use therein. More particularly it relates to mixes which are made with the aggregate and the bitumen at comparatively high temperatures and under conditions in which the ingredients are exposed, or substantially exposed, to the circumambient air during the mixing operation.

Bitumen contains many comparatively light hydrocarbon constituents which endow it with strength and particularly with toughness. When the bitumen is heated to comparatively high temperature, say of the order of 300° F., or above to render it sufficiently fluid for mixing with an aggregate a substantial proportion of the volatile constituents is lost. The loss is perhaps not so pronounced during the mere heating of the bitumen as when it is being mixed with the aggregate. The aggregate is also heated, and when the aggregate and the bitumen are mixed together to coat the particles of aggregate with a film of bitumen very large surfaces of the hot bitumen in extremely thin layers are exposed to the hot dry air in and around the mixer with the result that substantial volumes of the lighter hydro-carbons in the bitumen volatilize and are evaporated or otherwise dissipated. The bitumen is oxidized due to its contact with the hot, dry air and frequently, with the aggregate heated to excessively high temperatures, is burned.

The loss of the volatile constituents reduces the penetration, the cohesiveness and the adhesiveness of the asphalt and renders it brittle instead of tough.

I have discovered that these losses in essential volatiles which very greatly reduce the penetration of the bitumen and which occur in the preparation of hot bituminous mixes can be substantially lowered, and that the toughness and elasticity of the pavements made therefrom can be greatly improved by displacing or diluting the hot dry air which is normally present immediately over and around the mixture with steam, preferably wet, so that the free oxygen in the atmosphere in contact with the bitumen is not only substantially reduced but the character of the atmosphere is changed from dry to humid. Thus, the tendency of the bitumen to oxidize, and the evaporation and dissipation of those volatile constituents which maintain the penetration and toughness of the bitumen, are substantially reduced if not entirely eliminated.

No particular form of apparatus is necessary to maintain a blanket of steam over the surface of the material in the mixer but in the drawings I have illustrated one apparatus which may be employed.

Fig. 1 is a fragmentary, vertical, cross-section of a mixer, and is a section in the plane 1—1 of Fig. 2;

Fig. 2 is a fragmentary, sectional view of the mixer in the horizontal plane 2—2 of Fig. 1; and Fig. 3 is an enlarged, fragmentary, vertical, cross-section of Fig. 2 in the plane 3—3.

Referring to the drawings, 1 is a mixer box having a plurality of agitators 2 therein mounted on the horizontal shaft 3 which is adapted to be driven by suitable means (not shown) through the gear 4. The box will generally be open at the top but covers, or partial covers 5 and 6, which are hinged at 7 and 8, respectively, may be provided. Supported on suitable brackets 9 and 10 is a loop of pipe 11 extending around the interior of the mixer at the top. The pipes are provided with orifices 12 (see Fig. 3) which are so disposed as to direct steam passing therethrough downwardly towards the top of the material 13 in the mixer as shown at 14. Steam is supplied to the loop through the pipe 15 from any suitable source (not shown). Thus a blanket of steam substantially at atmospheric pressure is maintained over the top of the mix.

What I claim is:

1. Those steps in the method of preparing a bituminous paving mixture which comprise heating a bituminous material to a temperature at which it is fluid, incorporating said hot fluid material with an aggregate in a quantity at least sufficient completely to coat the particles of said aggregate with a thin film of said material, mixing said aggregate and said material together while preventing substantial loss into the circumambient air of volatile constituents from said bitumen and resultant reduction in the penetration thereof by maintaining a protecting blanket of steam at substantially atmospheric pressure over the top of said mixture substantially throughout the mixing operation.

2. Those steps in the method of preparing a bituminous paving mixture which comprise heating a bituminous material to a temperature at which it is fluid, incorporating said hot fluid material with an aggregate in a quantity at least sufficient completely to coat the particles of said aggregate with a thin film of said material, mixing said aggregate and said material together while preventing substantial loss into the circumambient air of volatile constituents from said bitumen and resultant reduction in the penetration thereof by directing a flow of steam over the top of said mixture to form and maintain thereover a protecting blanket of steam at substantially atmospheric pressure substantially throughout the mixing operation.

3. Those steps in the method of preparing a bituminous paving mixture which comprise heating a bituminous material to a temperature at which it is fluid, incorporating said hot fluid material with an aggregate in a quantity at least sufficient completely to coat the particles of said aggregate with a thin film of said material, mixing said aggregate and said material together while preventing substantial loss into the circumambient air of volatile constituents from said bitumen and resultant reduction in the penetration thereof by maintaining a protecting blanket of wet steam at substantially atmospheric pressure over the top of said mixture substantially throughout the mixing operation.

BERTRAND H. WAIT.

REFERENCES CITED

The following references are of record in the file of this patent:

UNITED STATES PATENTS

| Number | Name | Date |
| --- | --- | --- |
| 467,302 | Pitchford et al. | Jan. 19, 1892 |
| 711,115 | Lober | Oct. 14, 1902 |
| 1,188,081 | Kirschbraun | June 20, 1916 |
| 1,703,999 | Henley | Mar. 5, 1929 |
| 2,056,520 | Holbrook et al. | Oct. 6, 1936 |
| 2,080,690 | Bray et al. | May 18, 1937 |
| 2,152,798 | Fuller | Apr. 4, 1939 |
| 2,331,394 | Hjelte | Oct. 12, 1943 |

FOREIGN PATENTS

| Number | Country | Date |
| --- | --- | --- |
| 5,712 | Great Britain | Mar. 8, 1904 |